United States Patent
Hamilton et al.

(10) Patent No.: US 12,472,683 B2
(45) Date of Patent: Nov. 18, 2025

(54) COMPOSITE MATERIAL REINFORCED STEREOLITHOGRAPHY METHODS AND SYSTEMS

(71) Applicant: Formlabs Inc., Somerville, MA (US)

(72) Inventors: Jackson Hamilton, Somerville, MA (US); Cole Durbin, Cambridge, MA (US); Maxim Lobovsky, Cambridge, MA (US)

(73) Assignee: Formlabs Inc., Somerville, MA (US)

( * ) Notice: Subject to any disclaimer, the term of this patent is extended or adjusted under 35 U.S.C. 154(b) by 111 days.

(21) Appl. No.: 18/163,487

(22) Filed: Feb. 2, 2023

(65) Prior Publication Data
US 2023/0241835 A1 Aug. 3, 2023

Related U.S. Application Data

(60) Provisional application No. 63/267,511, filed on Feb. 3, 2022.

(51) Int. Cl.
*B29C 64/124* (2017.01)
*B29C 64/20* (2017.01)
*B29C 64/307* (2017.01)
*B29C 64/336* (2017.01)
*B29C 70/30* (2006.01)
*B33Y 10/00* (2015.01)
(Continued)

(52) U.S. Cl.
CPC ............ *B29C 64/124* (2017.08); *B29C 64/20* (2017.08); *B29C 64/307* (2017.08); *B33Y 10/00* (2014.12); *B33Y 30/00* (2014.12); *B33Y 40/00* (2014.12)

(58) Field of Classification Search
CPC ..... B29C 64/124; B29C 64/20; B29C 64/307; B29C 64/245; B29C 64/194; B29C 64/165; B29C 64/223; B29C 64/236; B29C 64/336; B33Y 10/00; B33Y 30/00; B33Y 40/00
See application file for complete search history.

(56) References Cited

U.S. PATENT DOCUMENTS 10,336,006 B1 * 7/2019 Cohen .................. B33Y 10/00
2018/0126633 A1 5/2018 Mehkri et al.
(Continued)

FOREIGN PATENT DOCUMENTS

WO 2021139497 A1 7/2021

OTHER PUBLICATIONS

English translation of CN 106476266 B (Year: 2019).*
International Search Report and Written Opinion relating to application PCT/US2023/061825, dated Jun. 2, 2022.

*Primary Examiner* — Galen H Hauth
*Assistant Examiner* — Baileigh Kate Darnell
(74) *Attorney, Agent, or Firm* — Honigman LLP

(57) ABSTRACT

A method for producing a three-dimensional object on an additive fabrication device includes placing a first composite material patch on a bottom of a vessel of the additive fabrication device. The method also includes moving a build plate of the additive fabrication device whereby at least one of the build platform or a layer of at least partially cured resin on the build plate touches the first composite material patch. The method further includes irradiating resin contained inside the vessel with an energy source to at least partially cure a layer of resin integrated with the first composite material patch.

18 Claims, 23 Drawing Sheets

(51) Int. Cl.
*B33Y 30/00* (2015.01)
*B33Y 40/00* (2020.01)

(56) References Cited

U.S. PATENT DOCUMENTS

2018/0207865 A1* 7/2018 Tyler ........................ B29C 70/06
2022/0339827 A1* 10/2022 Zhu ........................ B33Y 30/00

* cited by examiner

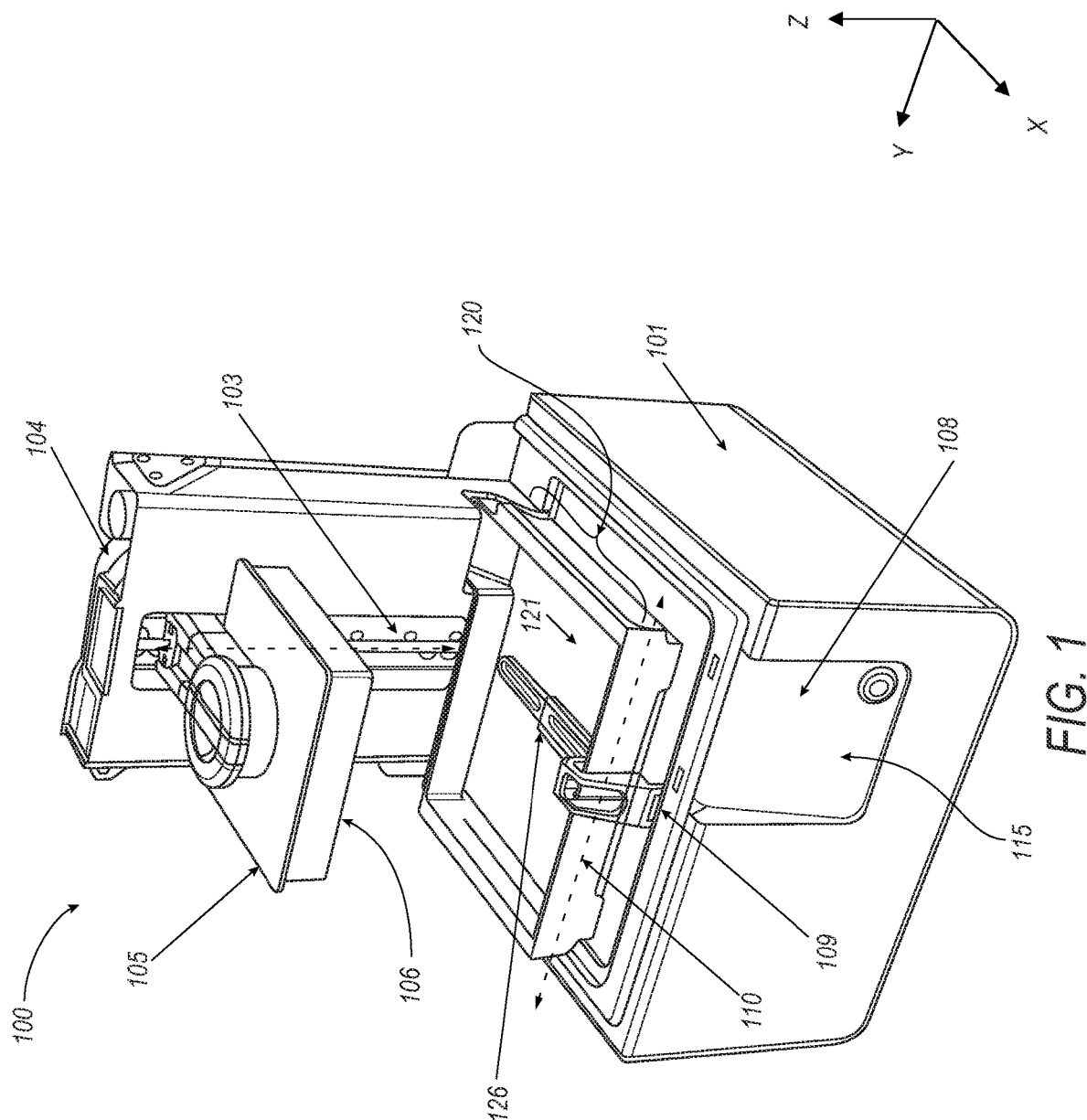

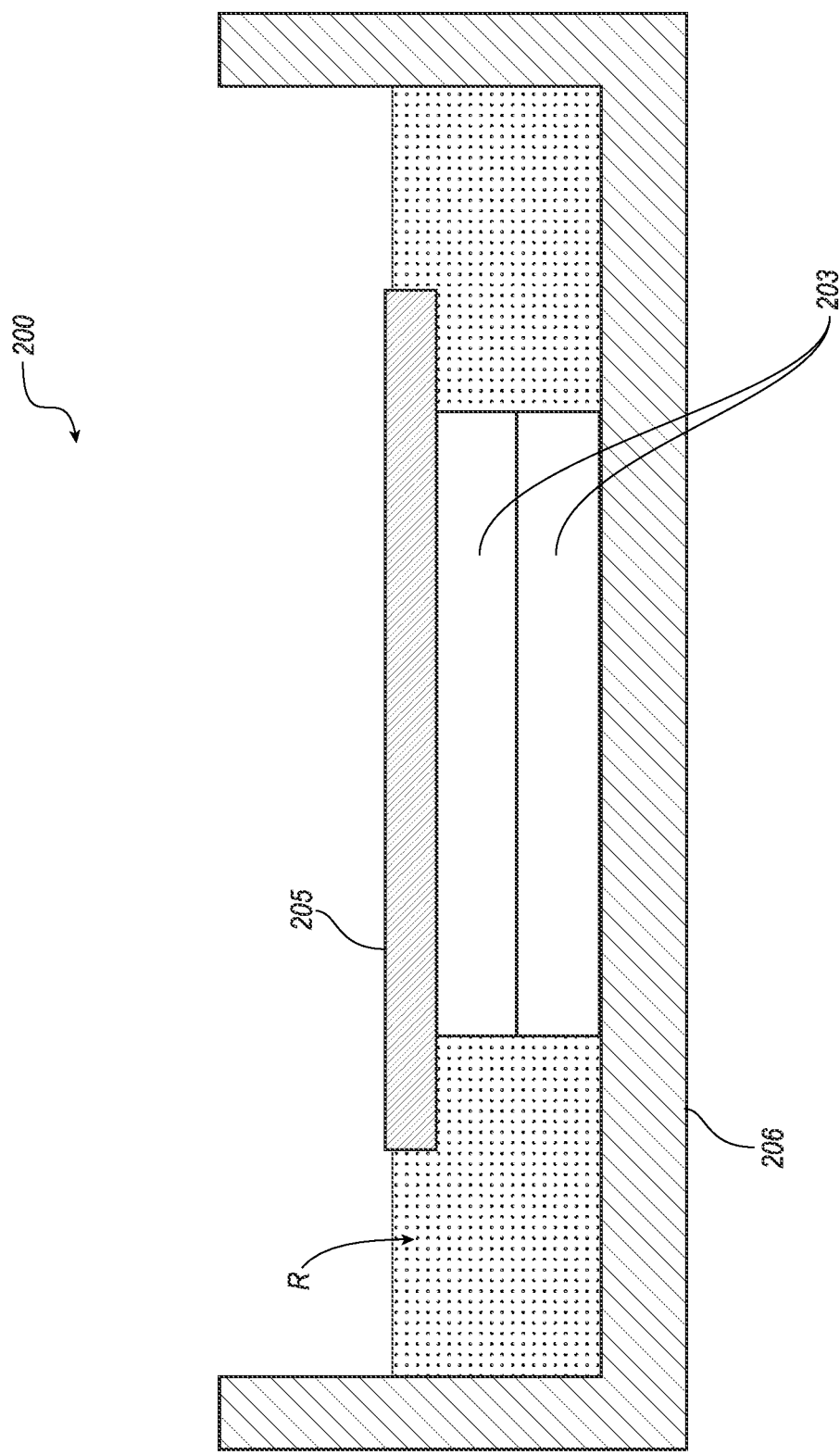

COMPOSITE MATERIAL REINFORCED STEREOLITHOGRAPHY METHODS AND SYSTEMS

CROSS REFERENCE TO RELATED APPLICATIONS

This application claims priority under 35 U.S.C. § 119(e) to U.S. Provisional Application 63/267,511, filed on Feb. 3, 2022. The disclosure of this prior application is considered part of the disclosure of this application and is hereby incorporated by reference in its entirety.

TECHNICAL FIELD

The present disclosure relates generally to systems and methods for a reinforced parts production for additive manufacturing.

BACKGROUND

Additive fabrication, e.g., 3-dimensional (3D) printing, provides techniques for fabricating objects (also referred to as parts) by causing portions of a building material to solidify at specific locations. Additive fabrication techniques may include stereolithography (SLA), selective or fused deposition modeling, direct composite manufacturing, laminated object manufacturing, selective phase area deposition, multiphase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography or inverted stereolithography, solid objects are created by successively forming thin layers of a curable polymer resin, typically first onto a build surface and then one on top of another. Exposure to actinic radiation cures a thin layer of liquid resin, which causes T to harden and adhere to previously cured layers and/or to a print substrate (i.e., film layer). As such, the adhesion between the previously formed layer of liquid resin and the print substrate must be separated before forming the next successive thin layer of liquid resin.

SLA printing is ideal for accuracy and fine detail, but struggles to produce high strength, high impact parts. Therefore, a system and method for producing reinforced cured-resin objects in SLA will be highly desired.

SUMMARY

An aspect of the disclosure provides a method for producing a three-dimensional object on an additive fabrication device. The method includes placing a first composite material patch on a bottom of a vessel of the additive fabrication device. The method also includes moving a build plate of the additive fabrication device whereby at least one of the build platform or a layer of at least partially cured resin on the build plate touches the first composite material patch. The method further includes irradiating resin contained inside the vessel with an energy source to at least partially cure a layer of resin integrated with the first composite material patch.

Implementations of the disclosure may include one or more of the following optional features. In some implementations, the first composite material patch is cut into a shape corresponding to a respective cross-sectional area of the three-dimensional object and is automatically placed on the bottom of the vessel via a transfer device. The method may further include moving the build platform with the at least partially cured layer of resin integrated with the composite material patch away from the bottom of the vessel. A second composite material patch may be placed onto the bottom of the vessel. Optionally, the second composite material patch may be at least one of a same shape and size as that of the first composite material patch. Alternatively, the second composite material patch may be at least one of a different shape or size from that of the first composite material patch.

Another aspect of the disclosure provides an additive fabrication device configured to manufacture a three-dimensional object including a vessel with a transparent bottom configured to hold a photocurable composition. The additive fabrication device also includes a build platform positioned above the vessel and configured to translate with respect to the vessel. An energy source is configured to emit an energy through the transparent bottom of the vessel. The additive fabrication device also includes a composite material dispenser, a sheet cutting device, a transfer device, and a controller communicably coupled to the build platform, the composite material dispenser, the energy source, the sheet cutting device, and the transfer device. The controller executes instructions which causes the energy course to irradiate the photocurable composition in the vessel to form a first at-least-partially-cured layer of the photocurable composition on the build platform or on a preciously-formed at-least-partially-cured layer of the photocurable composition. The executed instructions also cause the composite material dispenser to supply portions of a composite material sheet and the cutting device to cut one or more portions of the composite material sheet into one or more patches each with geometry corresponding to a respective cross-section of the three-dimensional object. The transfer device is caused to transfer a first patch of the one or more patches onto the transparent bottom of the vessel, and the energy source is caused to irradiate the photocurable composition, resulting in a second at-least-partially-cured layer of the photocurable composition integrated with the first patch and the first at-least-partially-cured layer of the photocurable composition.

This aspect may include one or more of the following optional features. In some aspects, the cutting device may include at least one of a roller cutter, a drag knife, a vibrating/ultrasonic knife, or a laser cutter. Optionally, the composite material sheet may include a fiberglass reinforced composite. In some examples, the photocurable composition may include at least one of a dual-curing component or a dark-curing polymer and the composite material sheet may include material not transmissive to the energy source. In some aspects, the composite material sheet may include carbon fiber. Optionally, the one or more patches may be nested on the composite material sheet thereby minimizing the required sheet area. The transfer device may include a vacuum-assisted gripper for picking up the first patches from the composite material sheet and placing the first patch onto the first at-least-partially-cured layer of the photocurable composition. In some examples, the transfer device may include an electrostatics-assisted gripper for picking up the first patch from the composite material sheet and placing the first patch onto the first at-least-partially-cured layer of the photocurable composition. The transfer device may include a gantry system for translating the build platform and causing the build platform to transfer the first patch onto the first at-least-partially-cured layer of the photocurable composition.

Optionally, each of the one or more patches may include a fixed inward offset from a perimeter of the corresponding respective cross-section of the three-dimensional object. Alternatively, each of the one or more patches may include a fixed outward offset from a perimeter of the corresponding respective cross-section of the three-dimensional object. In some aspects, the one or more patches are impregnated with binder material or supported by peel-away solid sheets to prevent fraying.

Another aspect of the disclosure provides an additive fabrication device configured to manufacture a three-dimensional object including a vessel with a transparent bottom and a build platform positioned above the vessel and configured to translate with respect to the vessel. The additive fabrication device also includes an energy source configured to emit an energy through the transparent bottom of the vessel, a composite material dispenser, a sheet cutting device, and a transfer device. A controller is communicably coupled to the build platform, the dispenser, the energy source, the cutting device, and the transfer device. The controller executes instructions which causes the composite material dispenser to supply portions of a composite material sheet, the cutting device to cut the portions of the composite material sheet into one or more patches, and the composite material dispenser to wet a first patch of the one or more patches with a photocurable composition. The instructions executed by the controller also causes the transfer device to transfer the wet first patch onto the transparent bottom of the vessel and the energy source to irradiate the wet first patch, resulting in the first wet patch suspended in a first at least-partially-cured-layer of the photocurable composition on the build platform.

This aspect may include one or more of the following optional features.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

Various aspects and examples will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

The technology described below relates to reinforcing 3D printed objects with composite materials such as fiberglass in stereolithography (SLA). The system and method involve adding composite material patches to print layers and selectively curing through them. The composite material patches may have been previously cut to correspond to respective cross-sections of the object to be produced, and may be automatically transferred to desired position on the bottom of the resin vessel of the stereolithography device.

FIG. 1 depicts an illustrative stereolithographic additive fabrication device, according to some examples.

FIGS. 2A-2F depict a first illustrative system and method for integrating composite material patches with SLA prints, according to some examples.

DETAILED DESCRIPTION

Figure 2B:
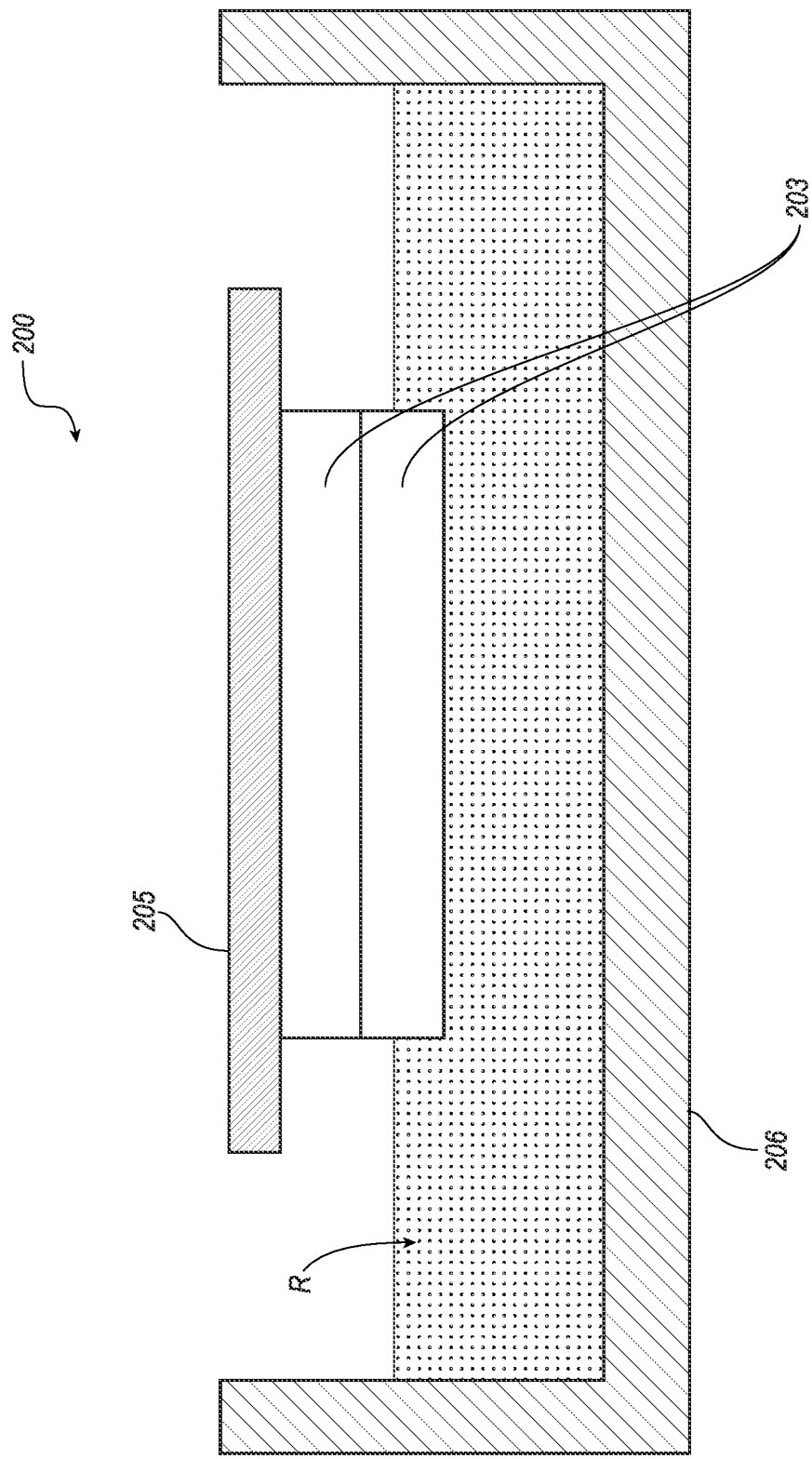

FIG. 1 depicts an illustrative additive fabrication device comprising a basin (also known as a resin vessel or resin tank) configured as per any of the implementations discussed below. In some implementations, an illustrative stereolithographic printer 100 includes a support base 101, a display and control panel 108, and a reservoir and dispensing system 104 for storage and dispensing of photopolymer resin. The support base 101 may contain various mechanical, optical, electrical, and electronic components that may be operable to fabricate objects using the system. During operation, photopolymer resin (i.e., liquid resin) may be dispensed from the dispensing system 104 into a resin basin (i.e., basin) 120. The control panel 108 may include data processing hardware 115 in communication with the control panel 108. The data processing hardware 115 may be in communication with each component of the stereolithographic printer 100. Moreover, a user may provide instructions to the data processing hardware 115 to execute operations on the stereolithographic printer 100 by interacting with the control panel 108.

A build plate or build platform 105 may be positioned along a vertical axis 103 (oriented along the z-axis direction as shown in FIG. 1) such that the downward-facing layer (lowest z-axis position) of an object being fabricated, or the downward-facing layer of the build platform 105 itself, is a desired distance along the z-axis from a bottom 121 of the basin 120. The desired distance between the build platform 105 and the bottom 121 of the basin 120 may be selected based on a desired thickness of a layer of solid material to be produced on the build platform 105 or onto a previously formed layer of the object being fabricated. In the example of FIG. 1, a first build surface 106 is defined on the bottom of the build platform 105 and faces in the −z direction, towards the basin 120. The build platform 105 may be removable from the stereolithographic printer 100. For instance, the build platform 105 may be attached to an arm (e.g., pressure fit or fastened onto) and may be removed from the printer 100 so that a part attached to the build surface 106 of the build platform 105 can be removed.

In the example of FIG. 1, the bottom 121 of the basin 120 may be transparent to actinic radiation that is generated by a radiation source (not shown) located within the support base 101, such that liquid photopolymer resin located between the bottom 121 of basin 120 and the bottom facing portion of build platform 105, or an object being fabricated thereon may be exposed to the radiation. Upon exposure to such actinic radiation, the liquid photopolymer resin may undergo a chemical reaction, sometimes referred to as curing, that substantially solidifies and attaches the exposed resin to the downward-facing portion of build platform 105 or to an object being fabricated thereon. FIG. 1 represents a configuration of the stereolithographic printer 100 prior to formation of any layers of an object on build platform 105 and, for clarity, also omits any liquid photopolymer resin from being shown within the depicted basin 120.

Following the curing of a layer of material, the build platform 105 may be moved along the vertical axis of motion 103 in order to reposition the build platform 105 for the formation of a new layer and/or to impose separation forces upon any bond with the bottom 121 of basin 120. In addition, the basin 120 is mounted onto the support base 101 such that the stereolithographic printer 100 may move the basin 120 along horizontal axis of motion 110, the motion thereby advantageously introducing additional separation forces in at least some cases. The basin 120 may include a wiper 126 capable of motion along the horizontal axis of motion 110 and may be removably or otherwise mounted onto the support base 101 at 109.

Figure 2C:
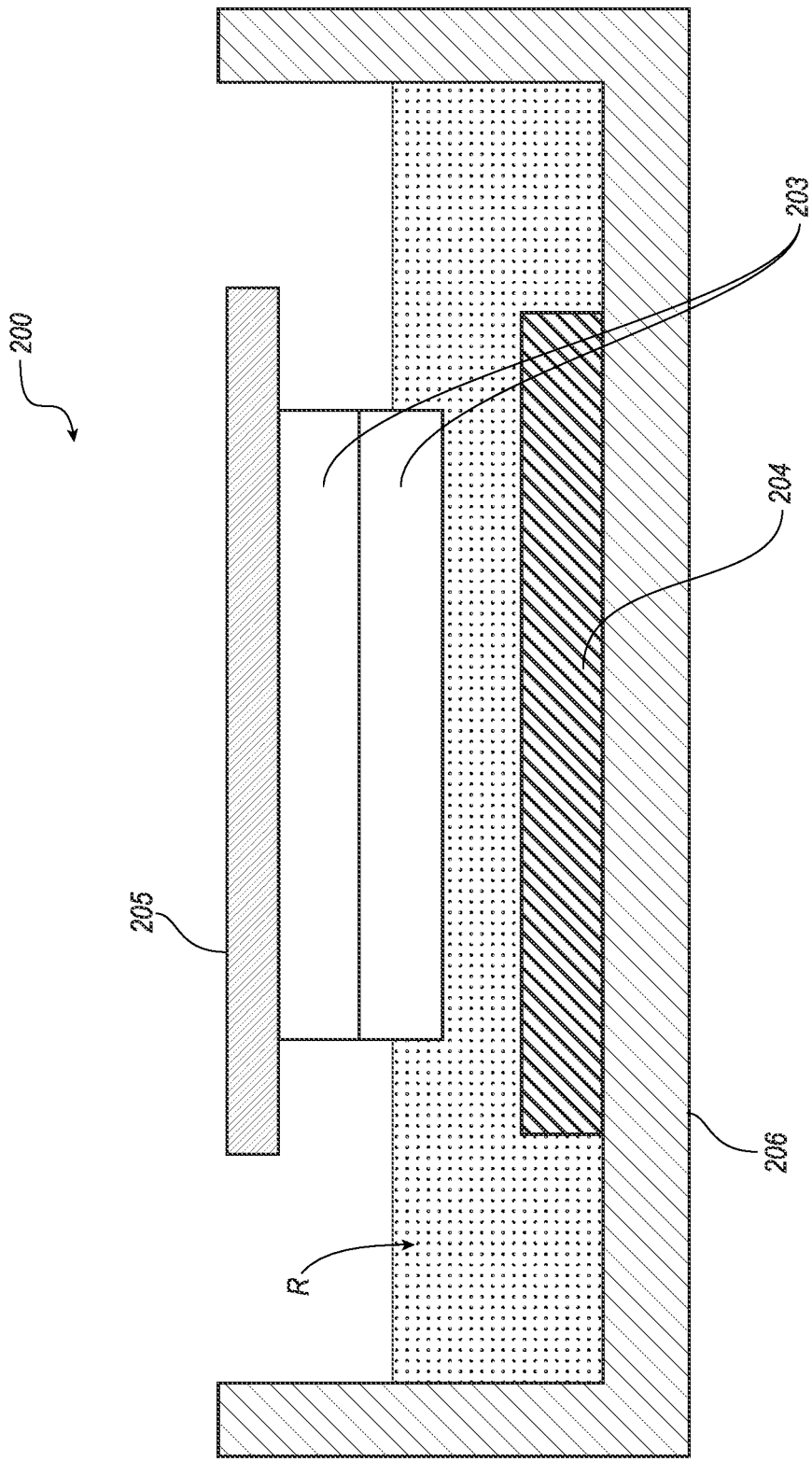

FIGS. 2A-2F depict a first illustrative system 200 and method for integrating composite material patches with SLA prints, according to some examples. FIG. 2A shows a build platform 205 of an SLA machine having two cured layers of resin 203 formed thereon, and a resin vessel or tank 206 holding a volume of resin R. Next, in FIG. 2B, the build platform 205 moves away from the bottom of the resin tank 206. In FIG. 2C, a patch of composite material 204 such as fiberglass is placed on the bottom of the resin tank 206, at a predetermined location that corresponds to the cross-section of the print object to be produced. The patch of composite material 204 is pre-cut to correspond to the size and shape of the cross-section of the print object (e.g., of the same size and shape, or of slightly bigger or smaller size and shape). For example, the patch 204 may include a fixed inward or outward offset from a perimeter of the corresponding respective cross-section of the three-dimensional object.

In some examples, the composite material patch 204 may be cut by a roller cutter, a drag knife, a vibrating/ultrasonic knife, or a laser cutter from a large composite material sheet such as a fiberglass sheet. In some examples, cutting a composite material sheet can cause the sheet (especially along the cut edge) to fray. To mitigate sheet fraying, the patches 204 may be previously impregnated with binder material or supported by peel-away solid sheets.

In some examples, the patch of composite material 204 is automatically placed at the desired location on the bottom of the resin tank 206 by a gantry system with a gripper. For example, the composite material patch 204 may be placed by a gantry system with a vacuum-assisted gripper that is configured to pick up the pre-cut composite material patch 204. In another example, the gripper is an electrostatics-assisted gripper for picking up the pre-cut patches.

In some examples, multiple patches are pre-cut from the composite material sheet and nested on the sheet to minimize the required sheet area. For example, each patch 204 would correspond to a respective cross-sectional area of the print to be produced.

In some examples, the composite material patch 204 is made of fiberglass due to fiberglass' transmissivity to UV and near-UV light, as well as its tendency to bond with resin R. Alternatively, the composite material patch 204 may be made of carbon fiber or other materials that are not significantly transmissive to UV or near-UV light, and the resin R may include dual-curing component or a dark-curing polymer.

Figure 2D:
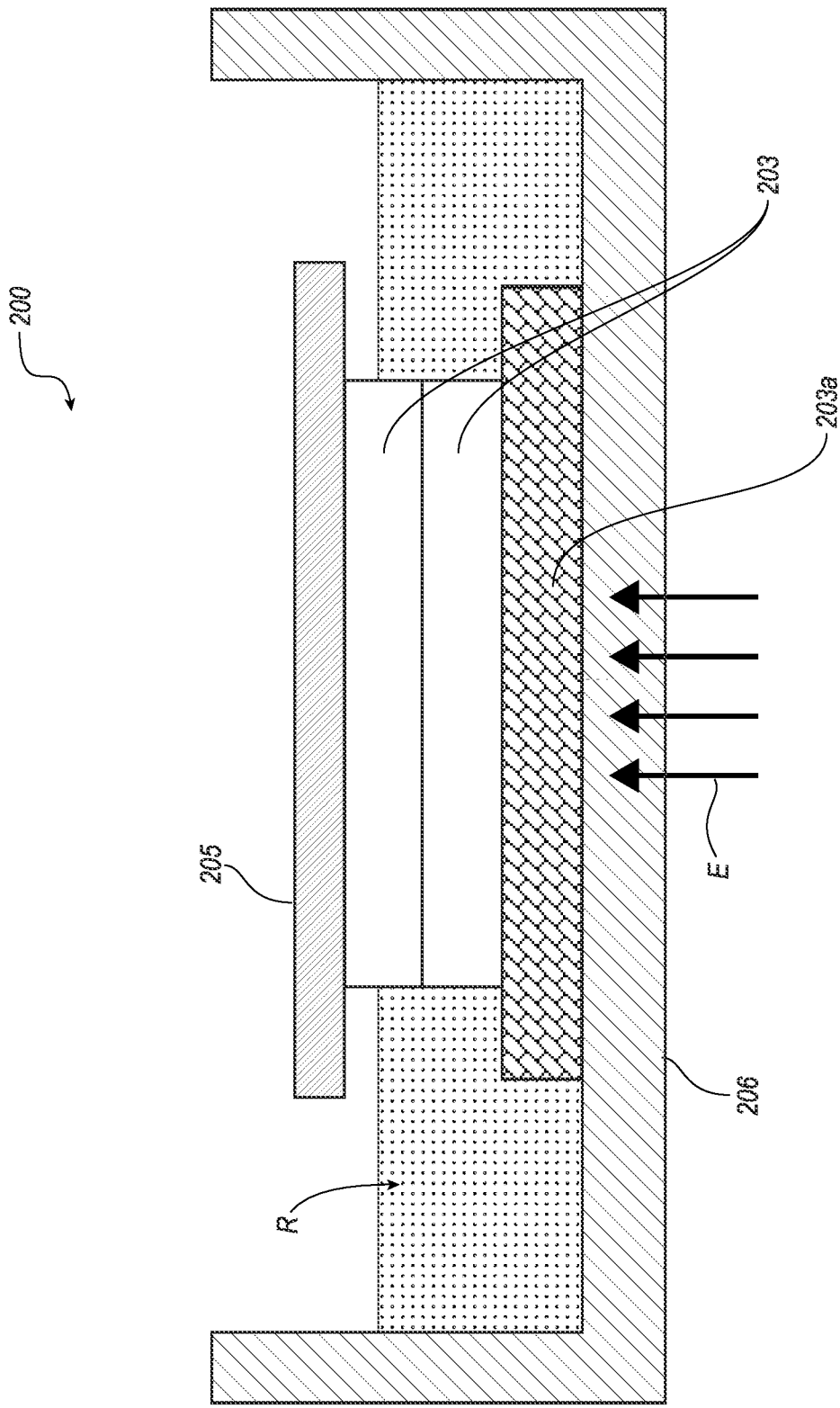

In FIG. 2D, the build platform 205 moves towards the composite material patch 204 and the previously cured (or partially-cured) resin layer 203 touches the composite material patch 204. The energy source turns on to emit curing energy E (e.g., actinic radiation) and causes a new layer 203a of resin to cure (or partially cure), integrating the composite material patch 204 with the previous layers 203.

Figure 2E:
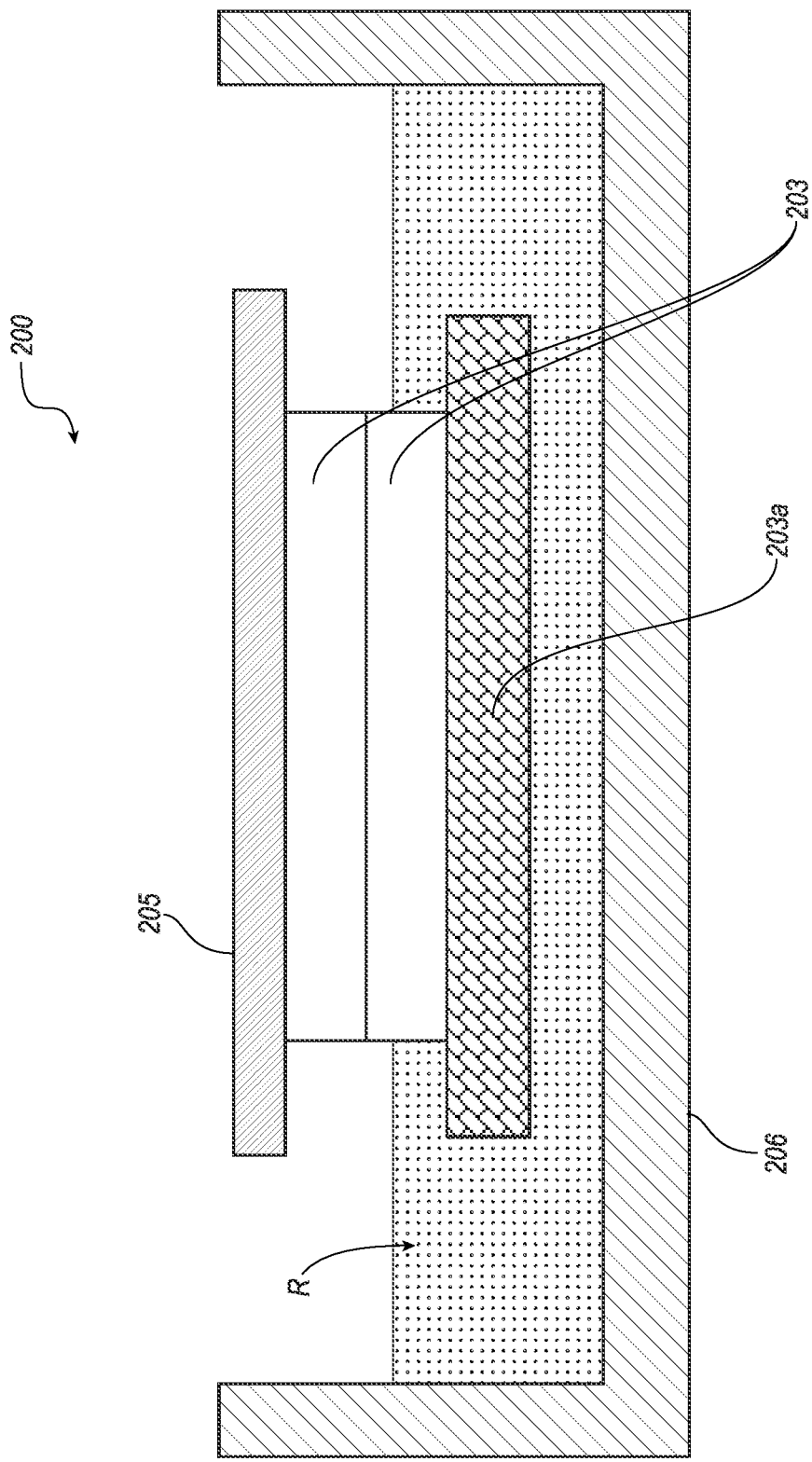
Figure 2F:
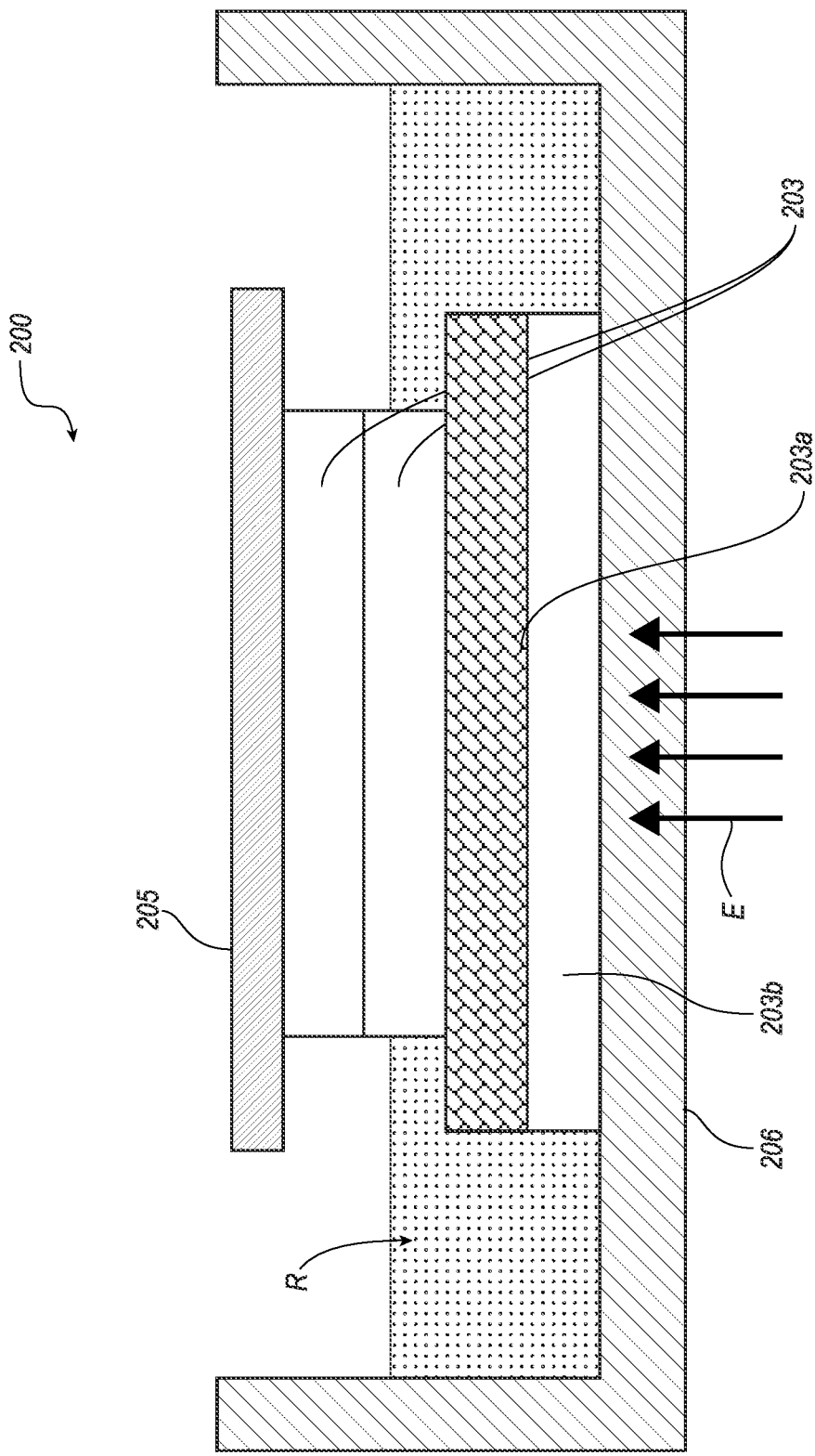
Figure 3A:
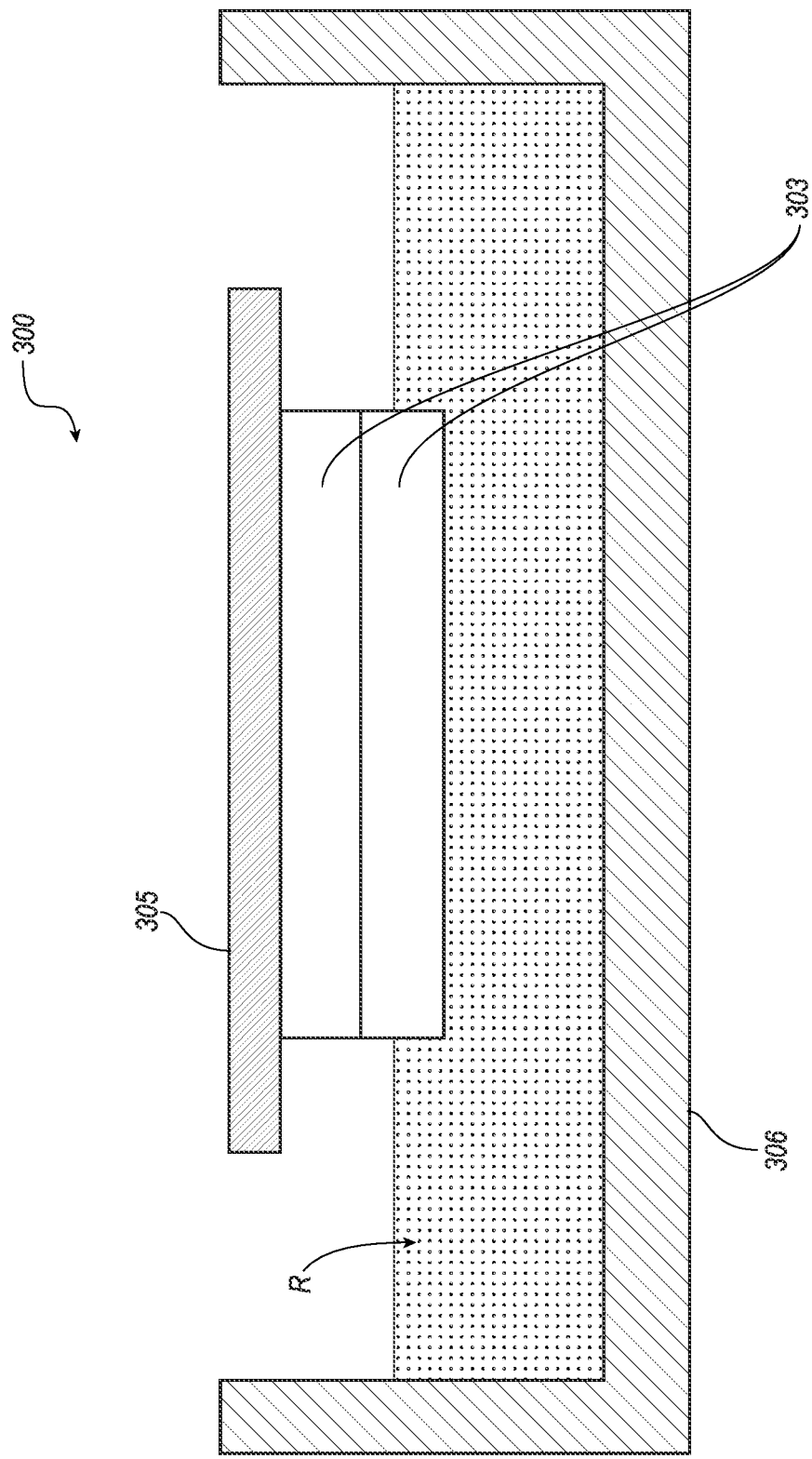
FIGS. 3A-3F depict a second illustrative system and method for integrating composite material patches with SLA prints, according to some examples.
Figure 3B:
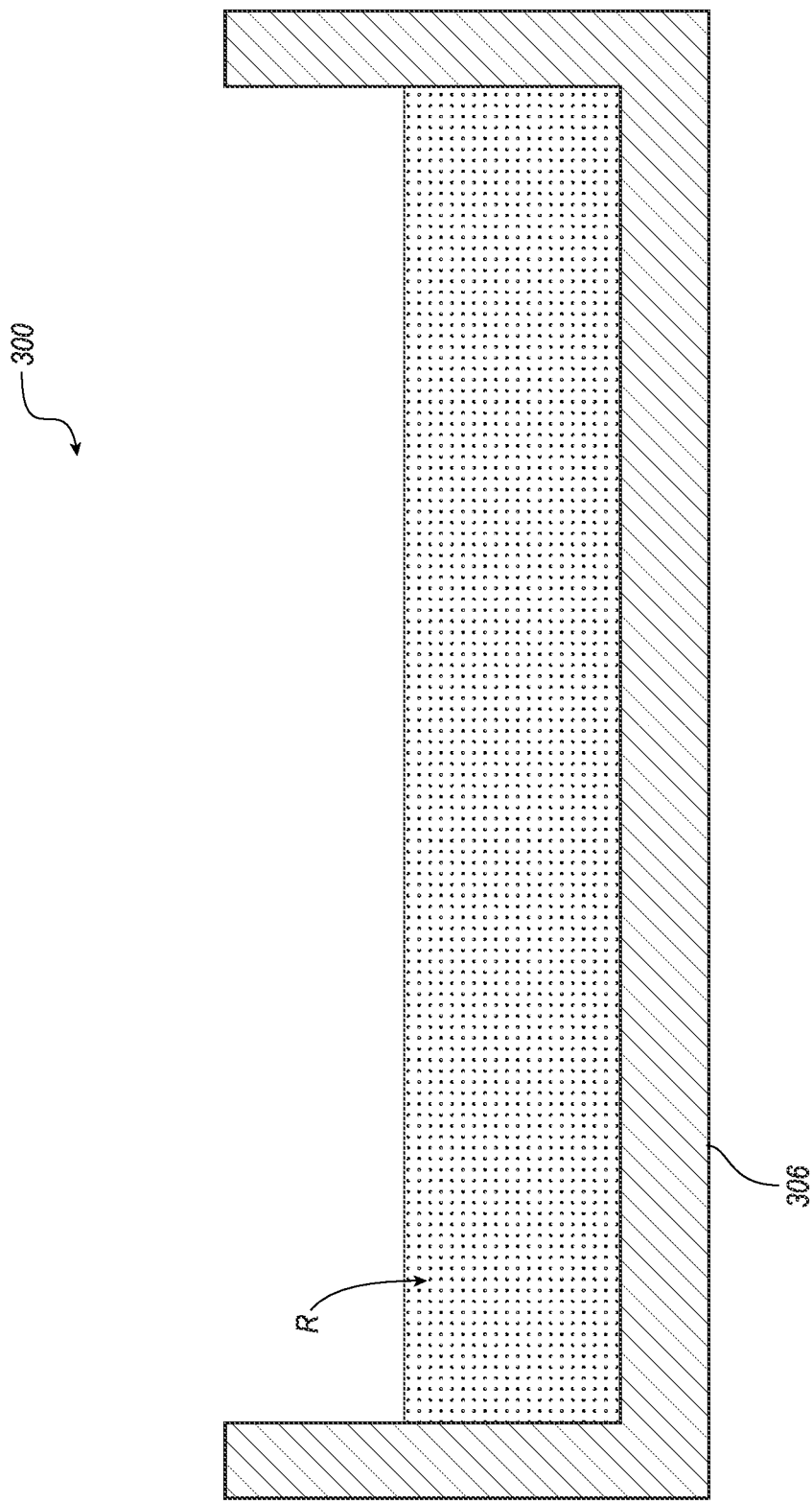
Figure 3C:
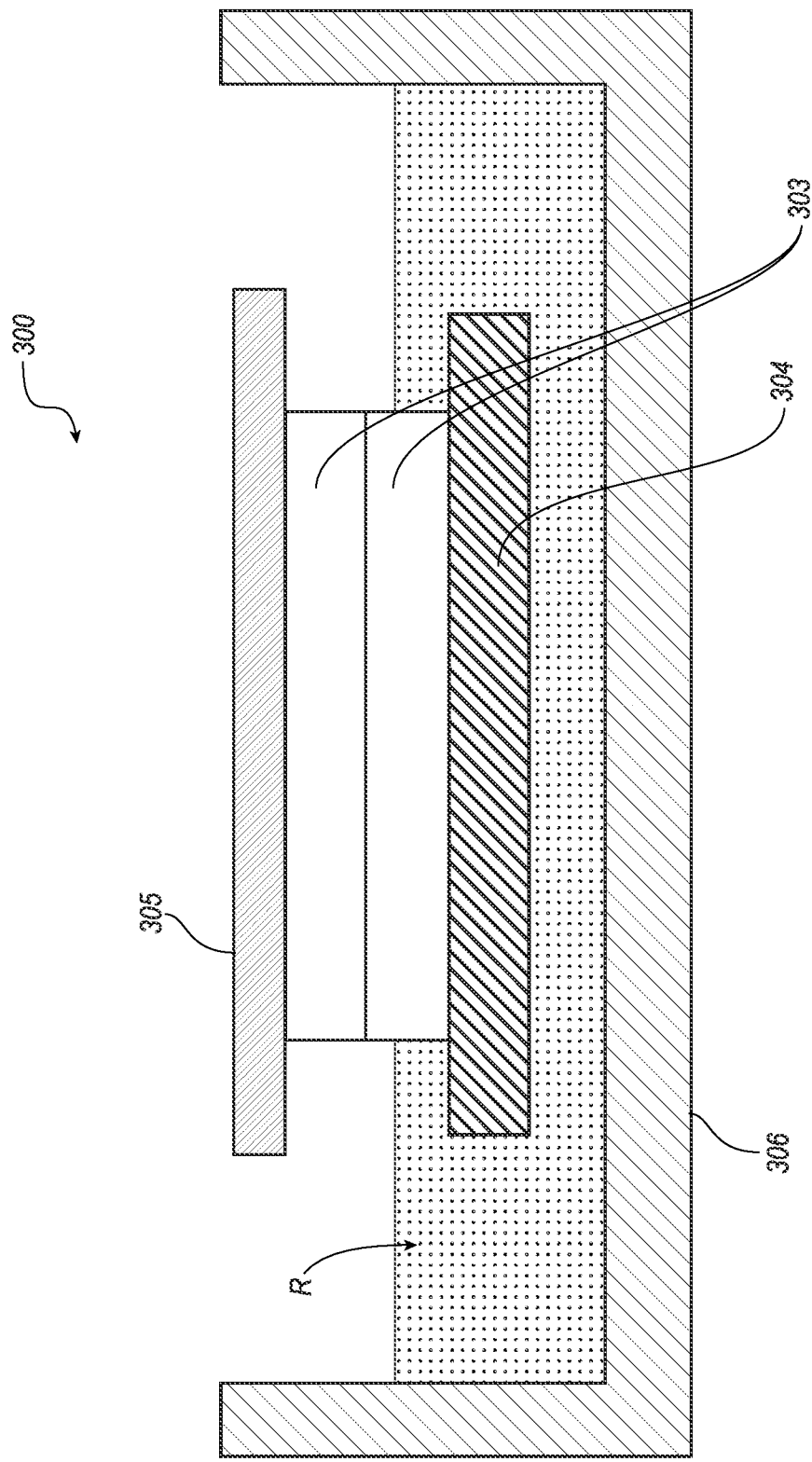
Figure 3D:
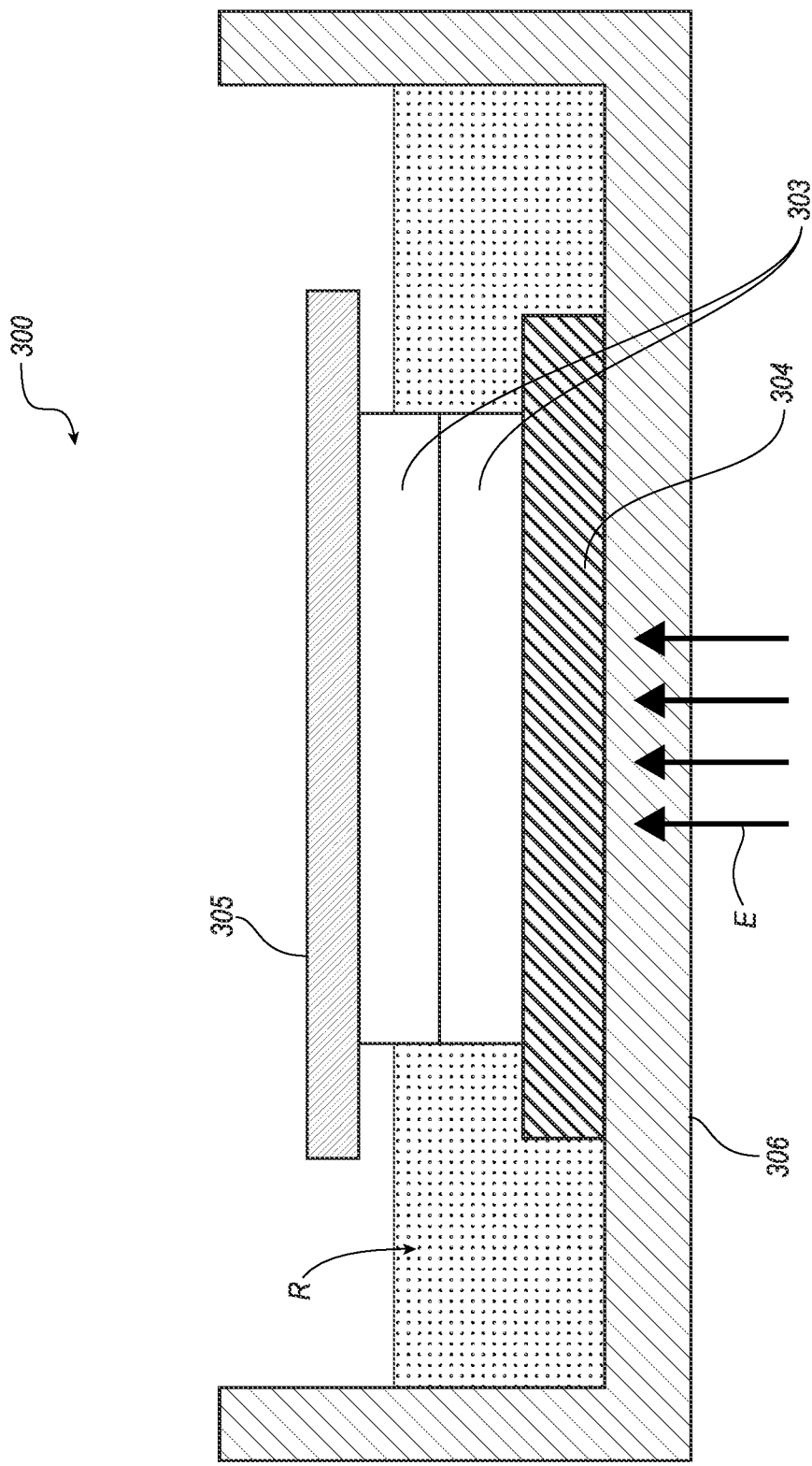
Figure 3E:
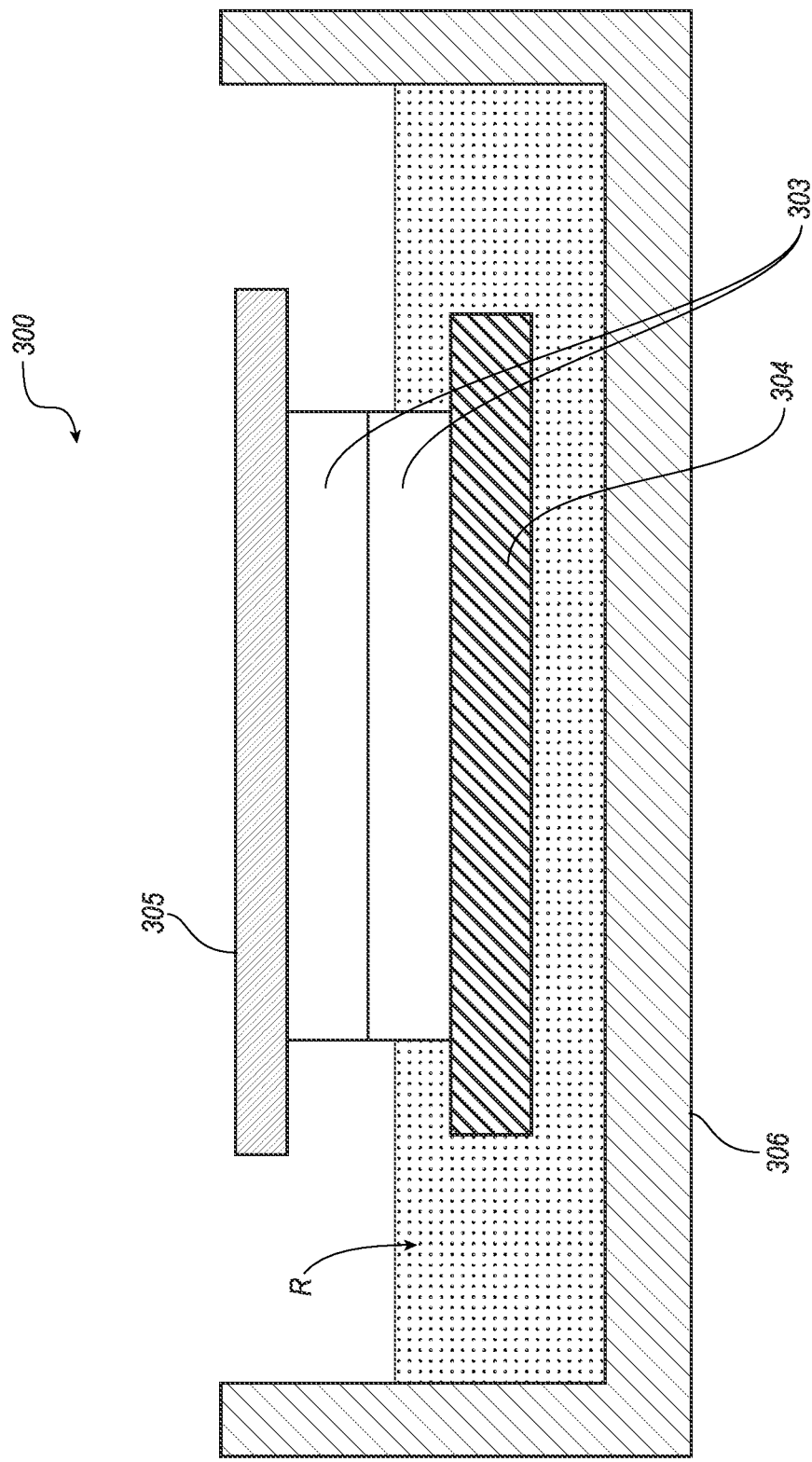
Figure 3F:
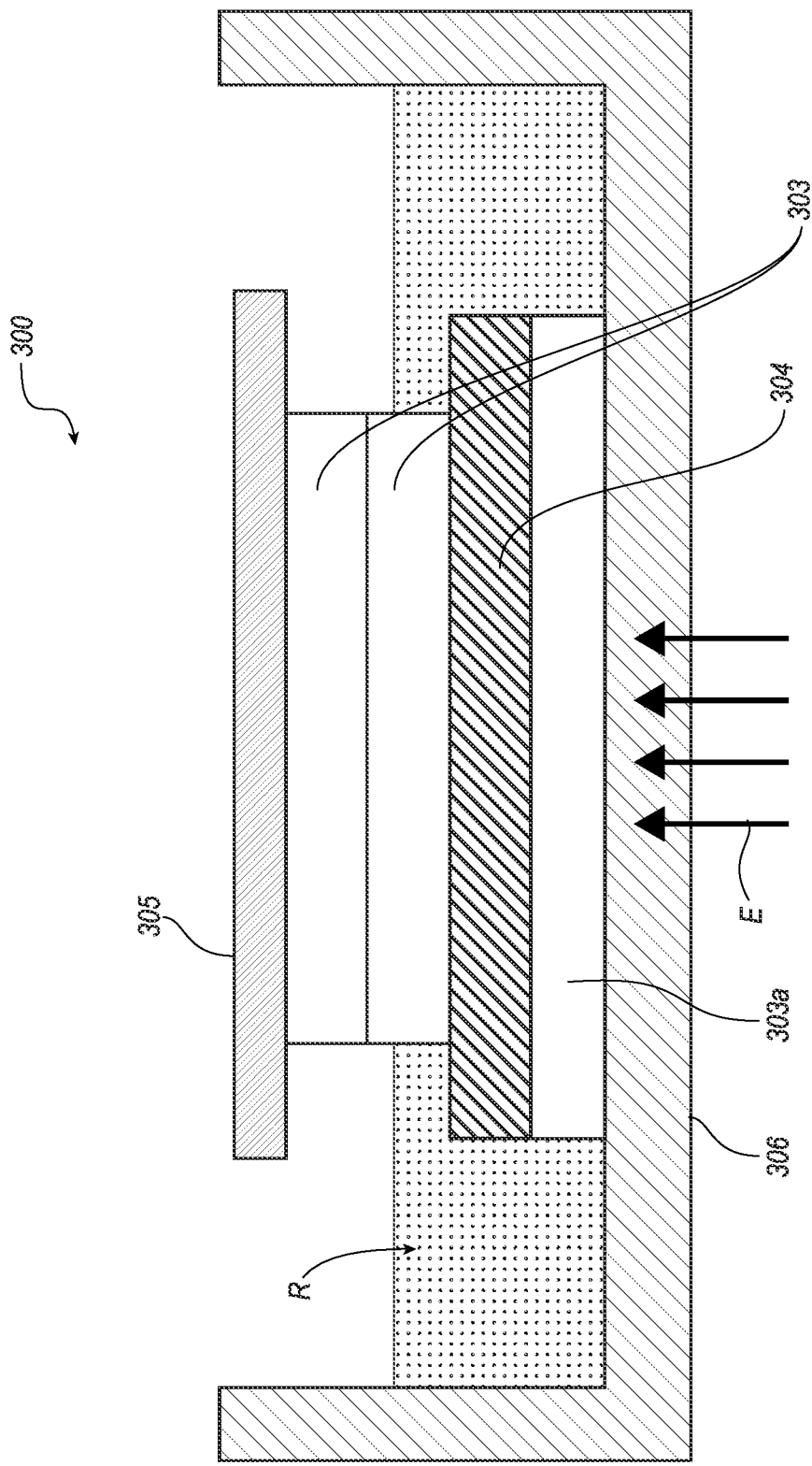

In FIGS. 2E-2F, the build platform 205 moves away from the bottom of the resin tank 206 and causes a new layer of resin 203b to cure below the integrated composite material patch 204. The new layer of resin 203b may generally take the cross-sectional shape of the composite material patch 204, such that the new layer of resin 203b may have a cross-sectional shape that may be different from the previously formed resin layer 203a. The varied cross-sectional shapes of the patch 204 and resin layers 203, 203b may be utilized to form the printed object having varied dimensions.

Although only one composite material patch 204 is shown in FIGS. 2A-2F, in practice, multiple composite material patches (successive or separated by conventionally cured resin layer) can be integrated with the printed part. The patches may be of the same size or shape, or different.

FIGS. 3A-3F depict a second illustrative system 300 and method for integrating composite material patches 304 with SLA prints, according to some examples. The composite material patch 304, instead of being placed on the bottom of the resin tank 306, is picked up directly by the build platform 305 (e.g., the patch sticks to the previously cured layers 303 due to the bonding between the resin R and the composite material 304). Layers without the composite material patches 304 are formed in conventional SLA printing method, and the build platform 305 is controlled to move to pick up composite material patches 304 outside of the resin tank 306, when a layer 303 is to be integrated with a composite material patch 304.

FIGS. 4A-4H depict a third illustrative system 400 and method for integrating composite material patches 404 with SLA prints, according to some examples. FIGS. 4A-4H shows a conveyor based system 400 that automates the process of patch cutting and patch picking for reinforced SLA printing. In each figure, the top diagram shows a side view of the system 400, while the bottom diagram shows a top view of the system 400.

A transfer device that includes two rollers 402 holding composite material sheet 404 is placed at each end of the system 400, with the composite material sheet 404 being moved freely from one roller 402 to the other. An automated cutting device 410 such as a laser cutter is configured to cut patches from the sheet 404, which is then transferred to the bottom of the resin tank 406, below the build platform 405. Two smaller rollers 402a are placed inside the resin tank 406 to hold the composite material sheet 404 flat against the bottom of the resin tank 406.

Figure 4A:
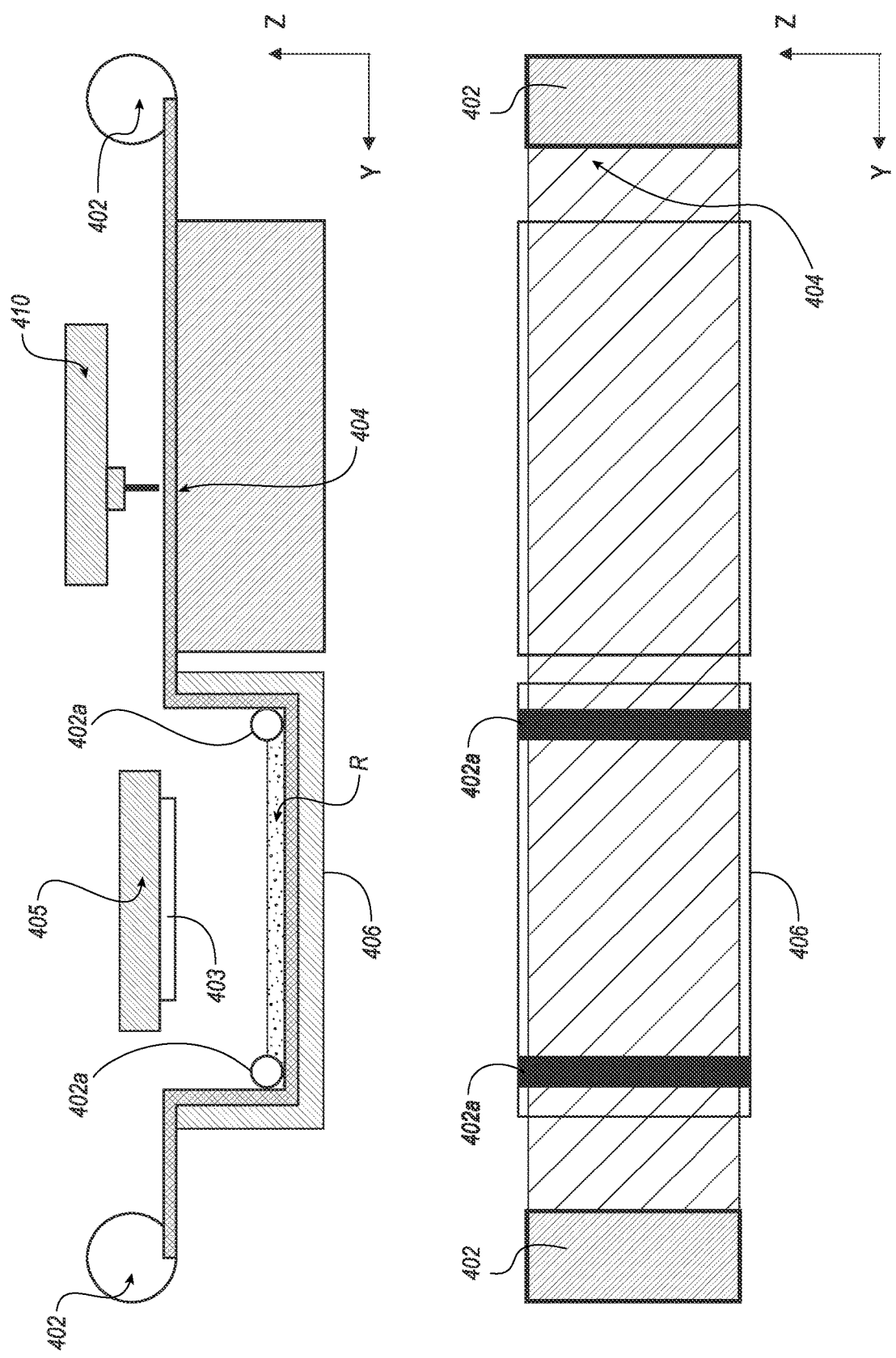
FIGS. 4A-4H depict a third illustrative system and method for integrating composite material patches with SLA prints, according to some examples.
Figure 4B:
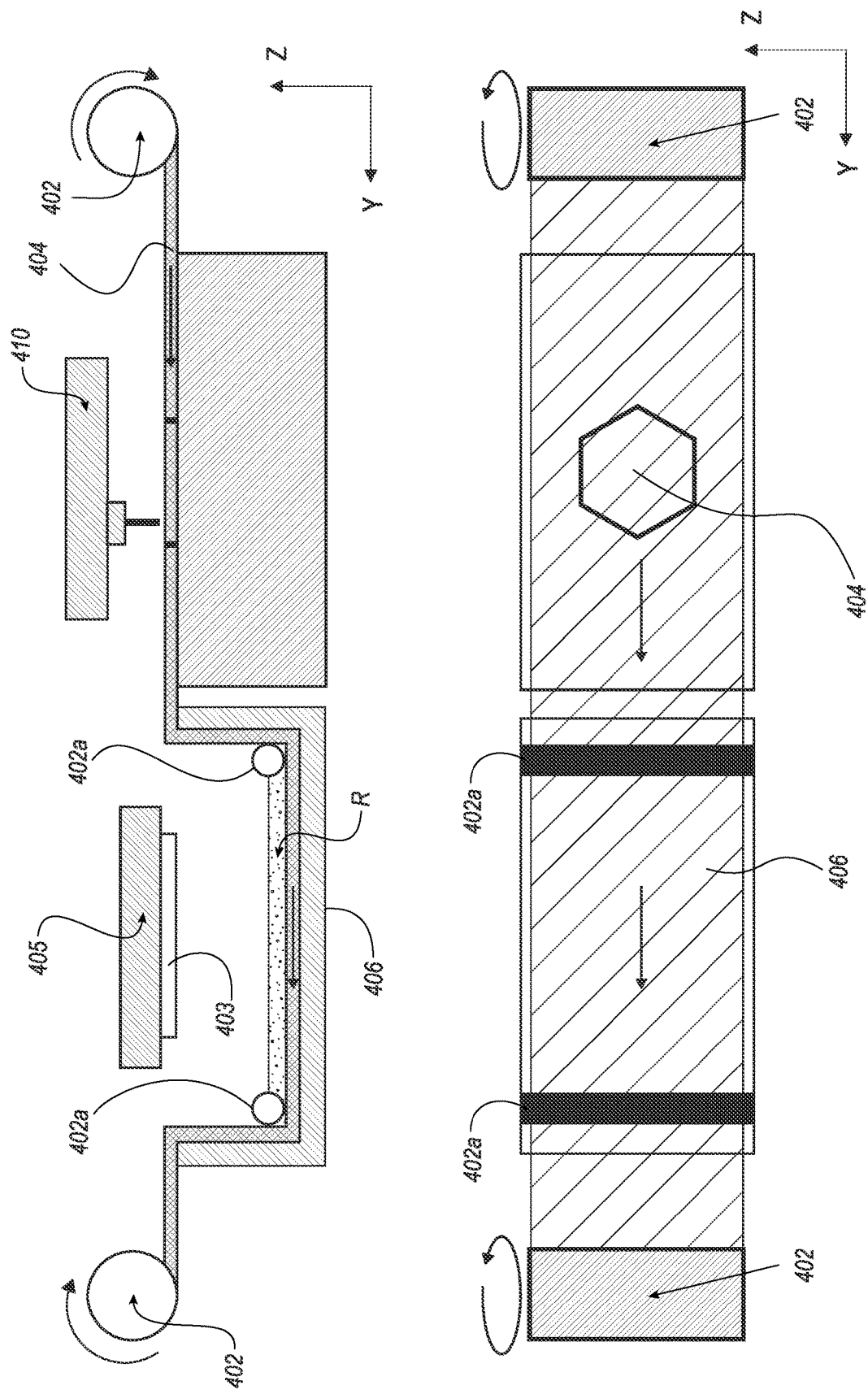
Figure 4C:
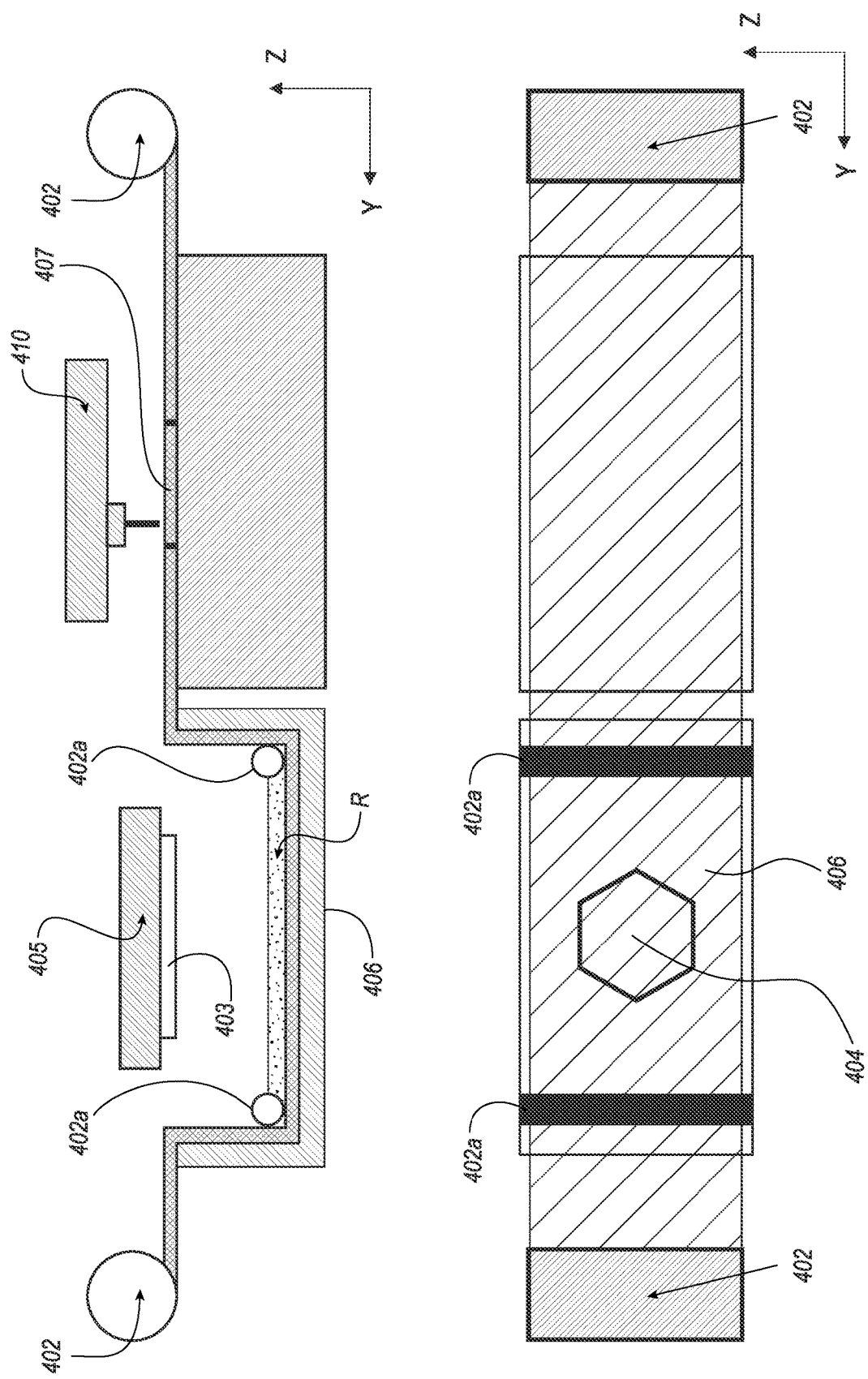

In FIG. 4B, the cutting device 410 first cuts patch 407 with a predetermined shape from the sheet 404, corresponding to a cross-section of the 3D object to be produced. The two rollers 402 start rotating and cause the pre-cut patch 407 to transfer to the resin tank 406 (partially filled with resin R). The two rollers 402 then stop rolling in FIG. 4C and cause the patch 404 to be placed at a predetermined location within the resin tank 406. The exact location at which the patch 407 stops is determined based on the position and cross-sectional shape of the object to be produced relative to the resin tank 406.

Figure 4D:
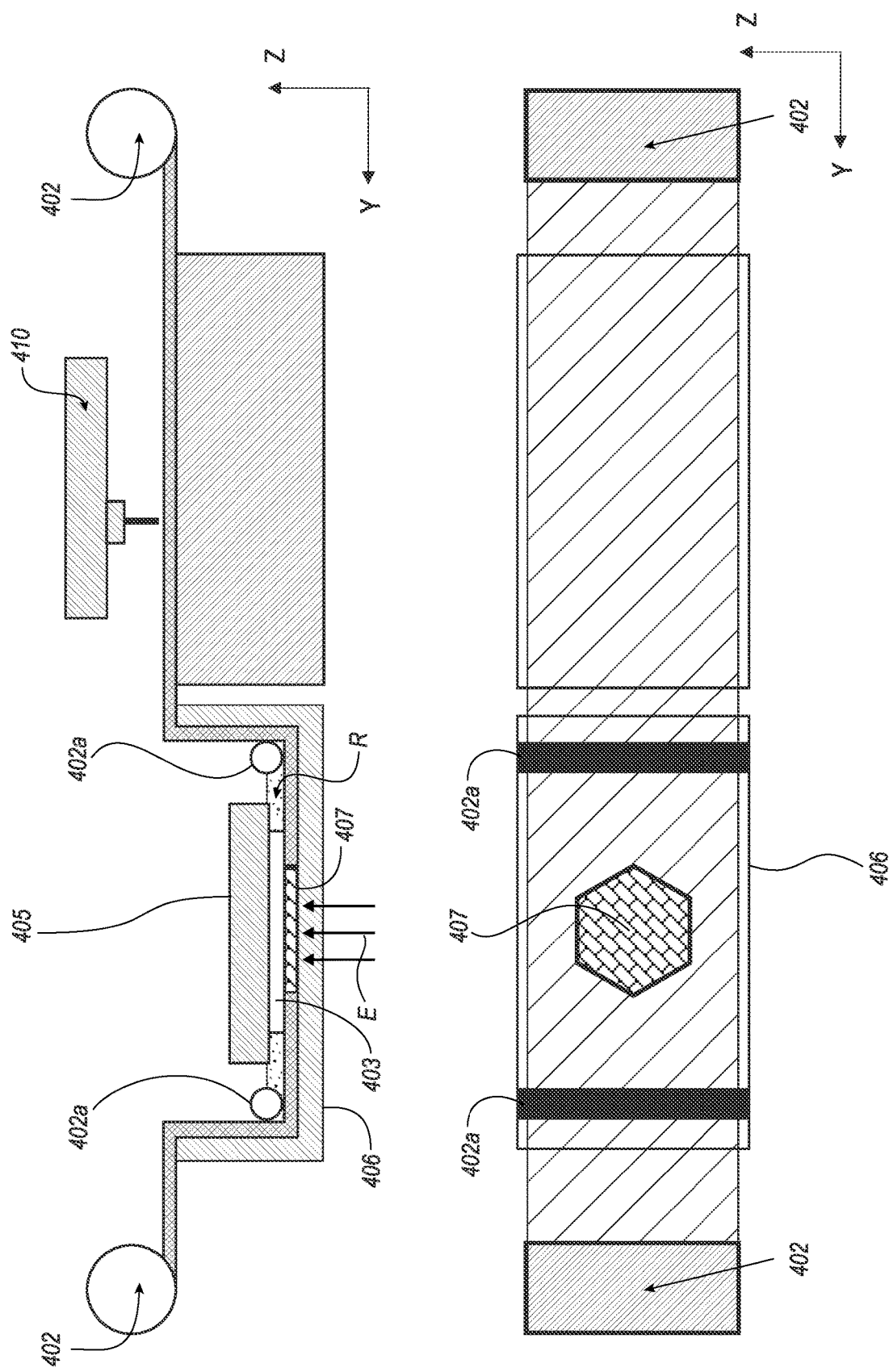
Figure 4E:
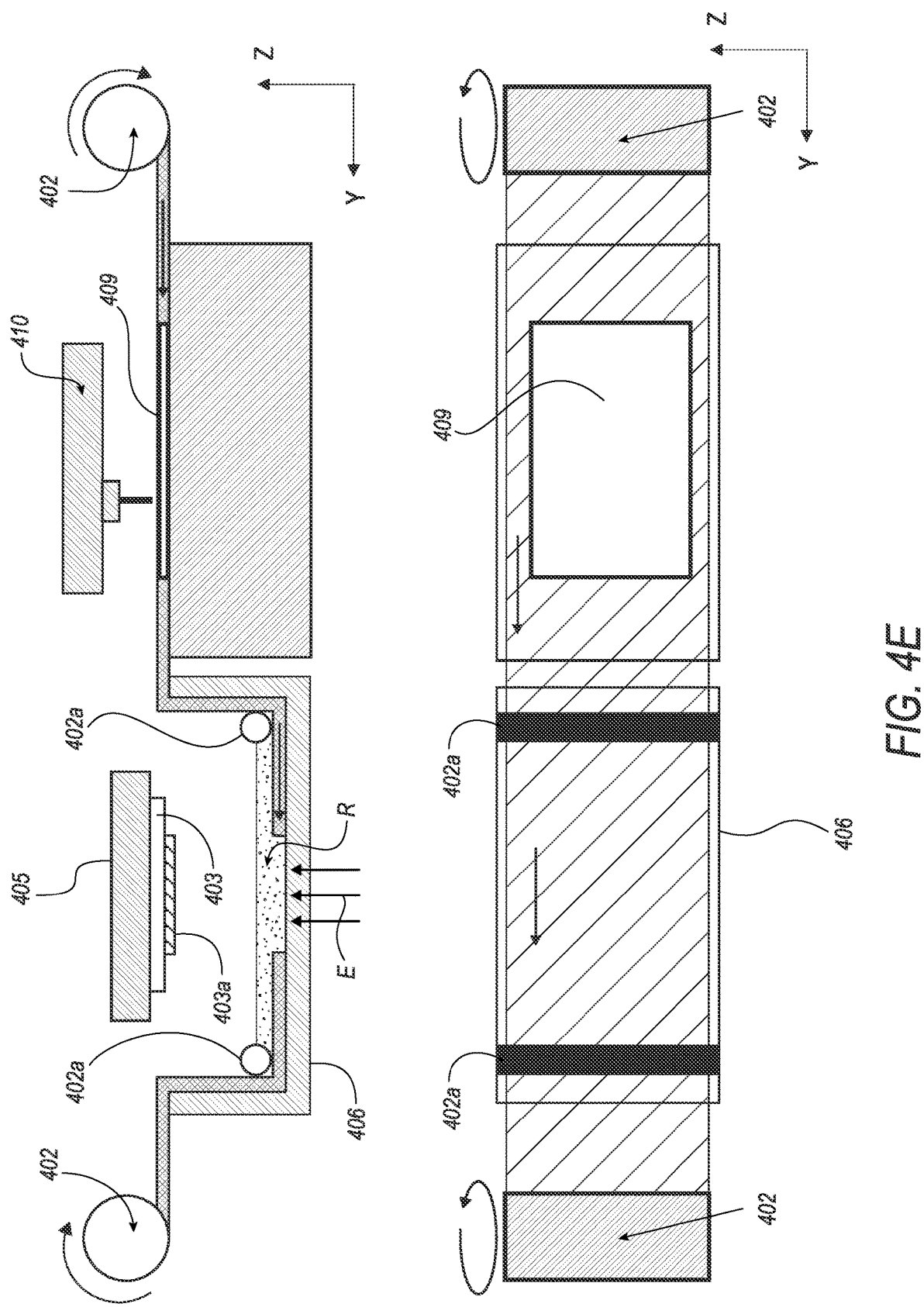
Figure 4F:
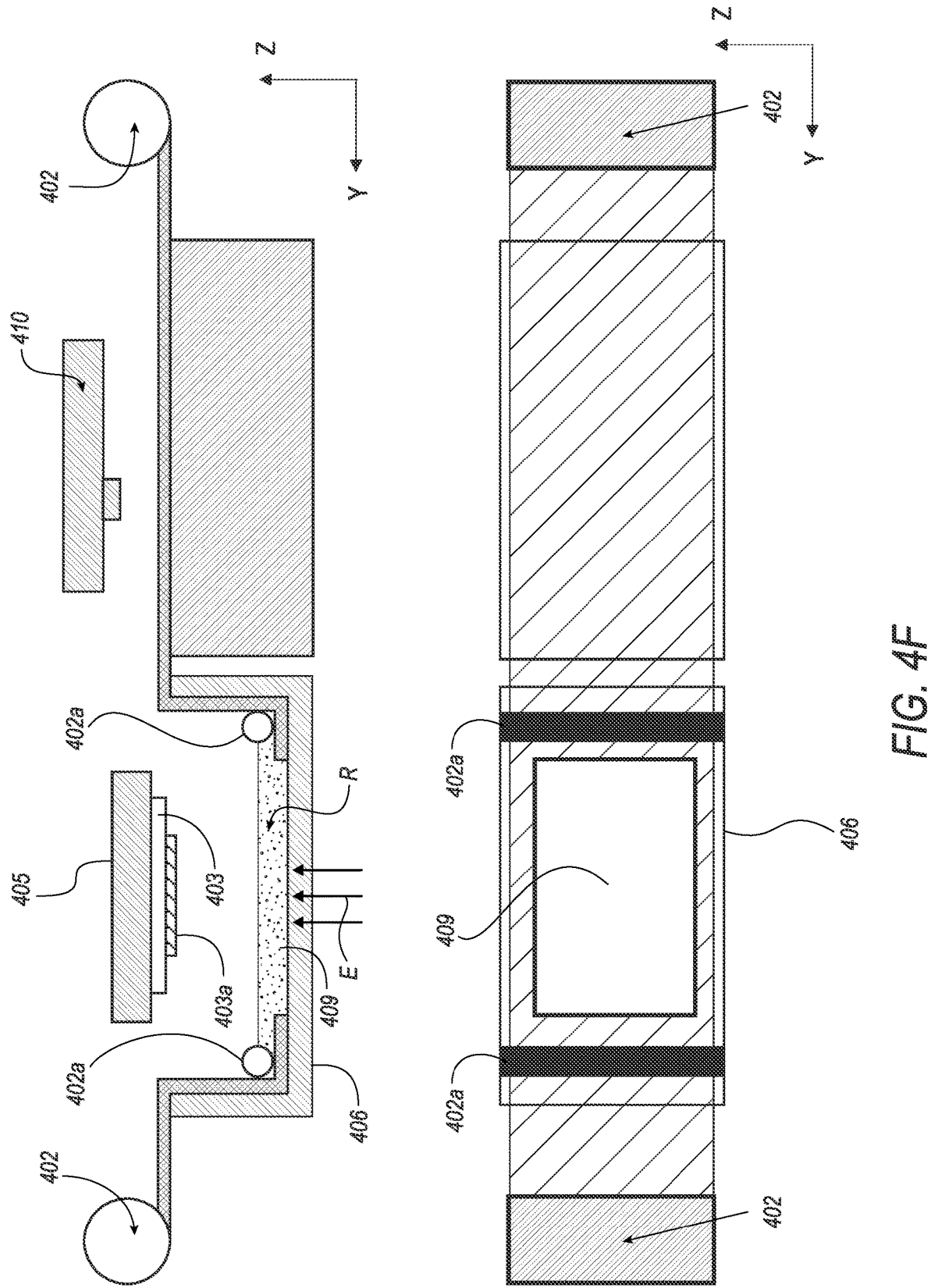
Figure 4G:
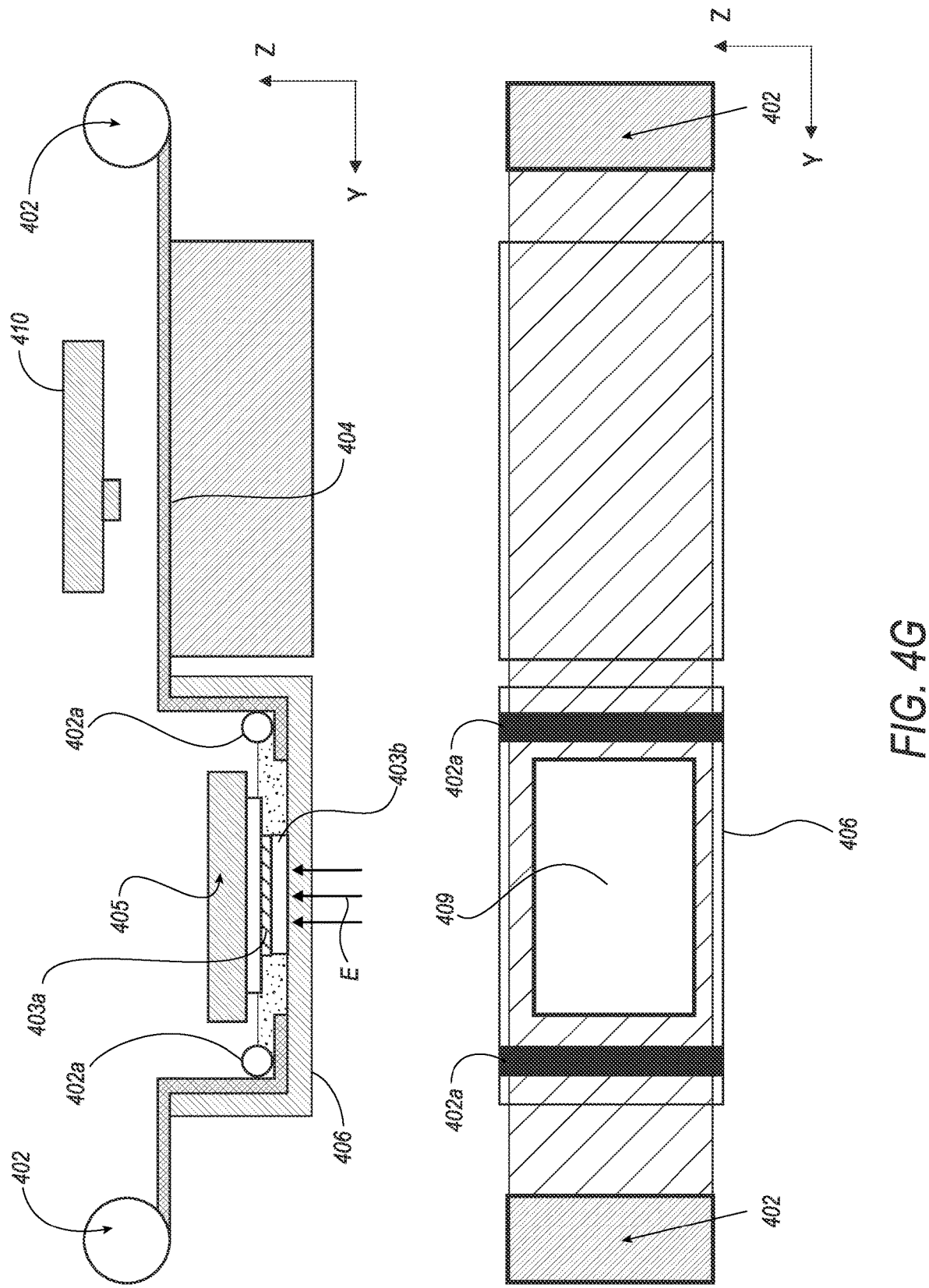
Figure 4H:
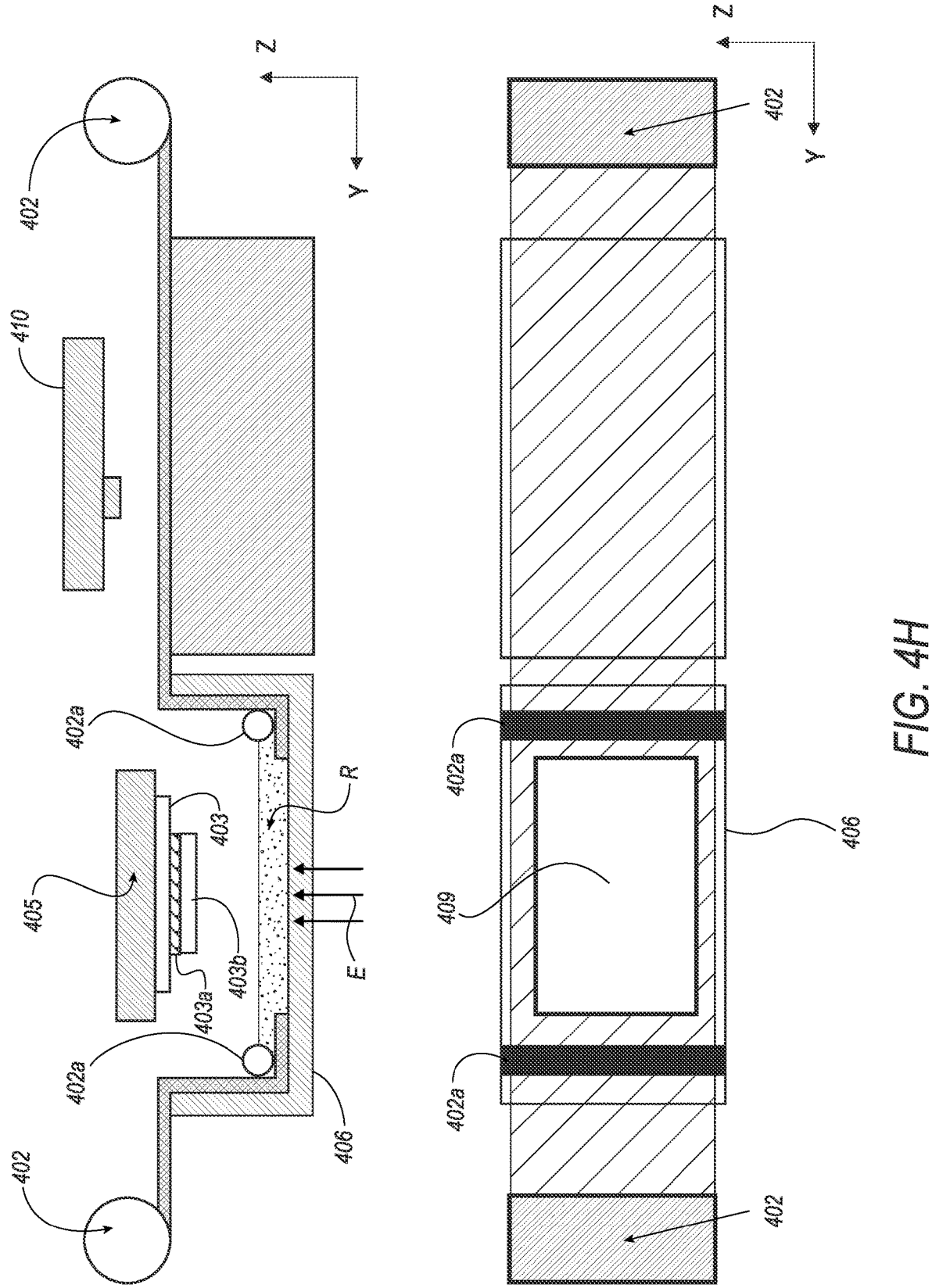

In FIG. 4D, the build platform 405 lowers to touch the pre-cut patch 407 with a previously cured resin layer 403. The energy source then turns on to cure through the composite material patch 407, causing the patch 407 to integrate with the cured layers 403 on the build platform 405. As a result, a layer 403a with integrated composite material patch 407 is produced for the object to be printed.

FIGS. 4E-4H show a method for producing a conventional SLA layer using the system 400. For example, the cutting device 410 may cut a large patch 407a corresponding to the area of the resin tank 406, and remove the patch 407a by a gripper before moving that "blank" area 409 into the resin tank 406. As a result, shown in FIG. 4G, the SLA machine can cure additional layers 403b through the blank area 409 without integrating composite material 404 into the print.

Alternatively, the SLA machine may cure through the composite material sheet 404 without cutting away a blank area. For example, the energy source may cure resin with a higher power and the build platform 405 will lower to a new position that causes one layer thickness between the top surface of the composite material sheet 404 and the bottom surface of the partially produced print.

Figure 5A:
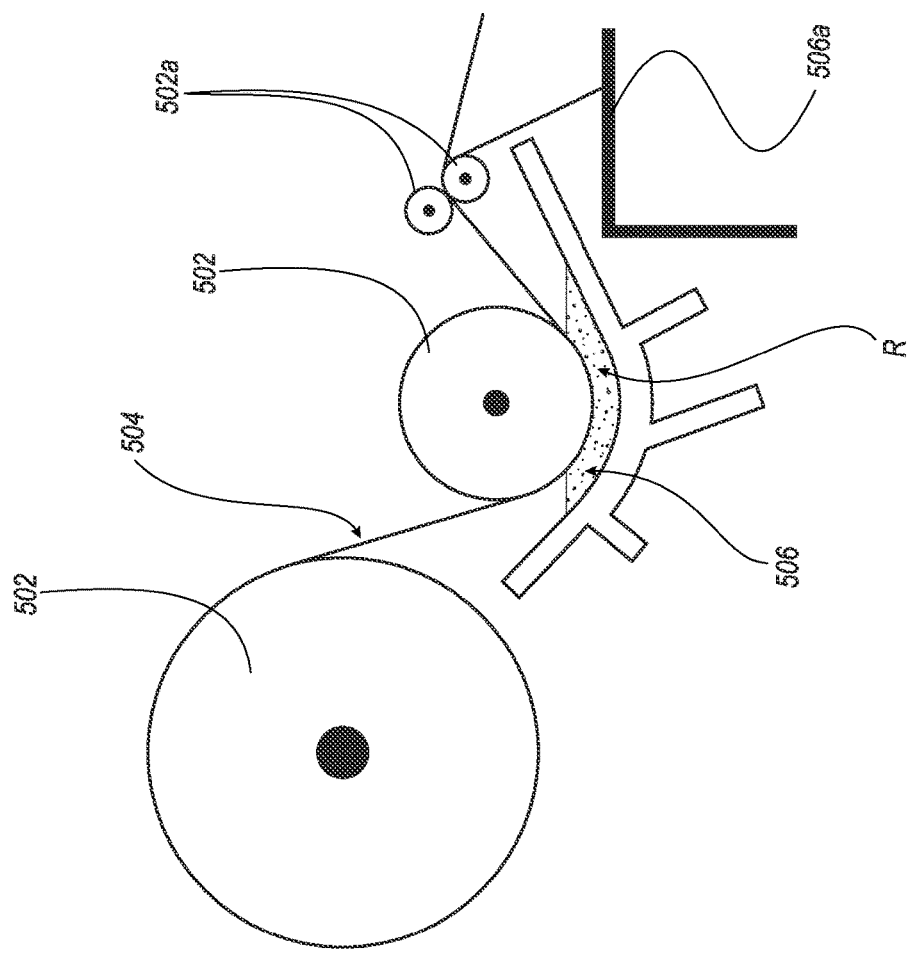
FIG. 5A depicts a schematic composite material dispenser for dispensing composite material and wetting the composite material in resin, according to some examples.
Figure 5B:
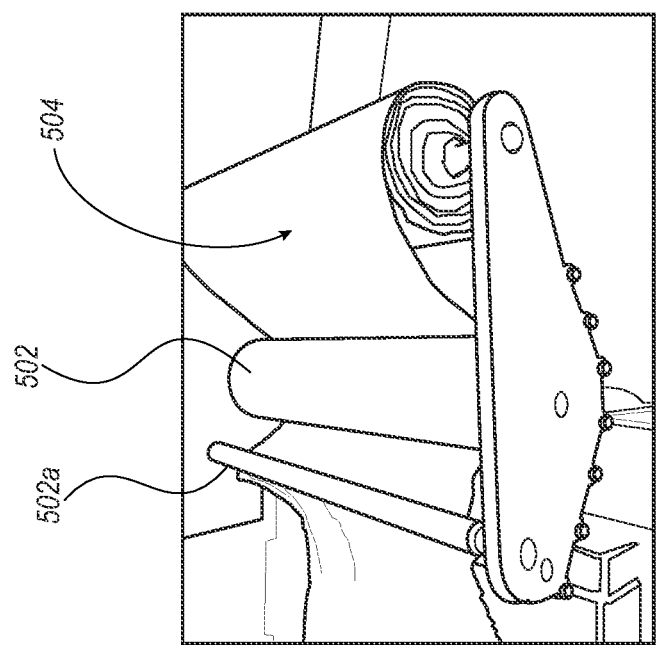
FIG. 5B depicts an illustrative composite material dispenser for dispensing composite material and wetting the composite material in resin, according to some examples.

FIG. 5 depicts an illustrative composite material dispenser 500 for dispensing composite material and wetting the said composite material 504 in resin R, according to some examples. The composite material dispenser 500 includes a resin reservoir 506 that holds a volume of resin R. A roller 502 holding composite material sheet 504 rotates and causes the composite material sheet 504 to go through the resin reservoir 506, underneath a transfer device or roller 502, and through two smaller pinning rollers 502a for removing excessive resin R. The wetted composite material sheet 504 is then rolled into an empty resin tank 506a for curing. In some examples, the composite material sheet 504 is cut to desired shapes (similar to that show in FIGS. 4A-4H) before being inserted into the resin R.

A number of implementations have been described. Nevertheless, it will be understood that various modifications may be made without departing from the spirit and scope of the disclosure. Accordingly, other implementations are within the scope of the following claims.

What is claimed is:

1. A method for producing a three-dimensional object on an additive fabrication device, comprising:
    cutting a first composite material patch into a shape corresponding to a respective cross-sectional area of the three-dimensional object;
    after the cutting step, placing the first composite material patch on a bottom of a vessel of the additive fabrication device;
    moving a build plate of the additive fabrication device whereby at least one of the build plate or a layer of at least partially cured resin on the build plate touches the first composite material patch; and
    irradiating resin contained inside the vessel with an energy source to at least partially cure a layer of resin integrated with the first composite material patch.

2. The method of claim 1, wherein the first composite material patch is automatically placed on the bottom of the vessel via a transfer device.

3. The method of claim 2, further including:
    moving the build plate with the at least partially cured layer of resin integrated with the first composite material patch away from the bottom of the vessel; and
    placing a second composite material patch onto the bottom of the vessel.

4. The method of claim 3, wherein the second composite material patch is at least one of a same shape and size as that of the first composite material patch.

5. The method of claim 3, wherein the second composite material patch is at least one of a different shape or size from that of the first composite material patch.

6. A method for producing a three-dimensional object on an additive fabrication device, comprising:
    placing a first composite material patch on a bottom of a vessel of the additive fabrication device, the first composite material patch is pre-cut before placing to correspond to a shape of a cross-section of the three-dimensional object;
    moving a build plate of the additive fabrication device whereby at least one of the build plate or a layer of at least partially cured resin on the build plate touches the first composite material patch; and
    irradiating resin contained inside the vessel with an energy source to at least partially cure a layer of resin integrated with the first composite material patch.

7. The method of claim 6, wherein the first composite material patch is automatically placed on the bottom of the vessel via a transfer device.

8. The method of claim 7, further including:
    moving the build plate with the at least partially cured layer of resin integrated with the first composite material patch away from the bottom of the vessel; and
    placing a second composite material patch onto the bottom of the vessel.

9. The method of claim 8, wherein the second composite material patch is at least one of a same shape and size as that of the first composite material patch.

10. The method of claim 8, wherein the second composite material patch is at least one of a different shape or size from that of the first composite material patch.

11. The method of claim 7, further comprising cutting the first composite material patch from a composite material sheet to form the first composite material patch.

12. The method of claim 11, wherein the composite material sheet is pre-impregnated with a binder material.

13. A method for producing a three-dimensional object on an additive fabrication device, comprising:
    cutting a first composite material patch from a composite material sheet;
    placing the first composite material patch on a bottom of a vessel of the additive fabrication device;
    moving a build plate of the additive fabrication device whereby at least one of the build plate or a layer of at least partially cured resin on the build plate touches the first composite material patch; and
    irradiating resin contained inside the vessel with an energy source to at least partially cure a layer of resin integrated with the first composite material patch.

14. The method of claim 13, wherein the first composite material patch is cut into a shape corresponding to a respective cross-sectional area of the three-dimensional object and is automatically placed on the bottom of the vessel via a transfer device.

15. The method of claim 14, further including:
    moving the build plate with the at least partially cured layer of resin integrated with the first composite material patch away from the bottom of the vessel; and
    placing a second composite material patch onto the bottom of the vessel.

16. The method of claim 15, wherein the second composite material patch is at least one of a same shape and size as that of the first composite material patch.

17. The method of claim 15, wherein the second composite material patch is at least one of a different shape or size from that of the first composite material patch.

18. The method of claim 13, wherein the composite material sheet is pre-impregnated with a binder material.

\* \* \* \* \*